United States Patent
Claessen

(10) Patent No.: US 8,345,577 B2
(45) Date of Patent: Jan. 1, 2013

(54) HIGH SPEED WIRELESS INFRASTRUCTURE

(75) Inventor: Albertus Maria Gerardus Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 286 days.

(21) Appl. No.: 12/655,265

(22) Filed: Dec. 28, 2009

(65) Prior Publication Data

US 2011/0158126 A1    Jun. 30, 2011

(51) Int. Cl.
*H04L 12/28* (2006.01)
*H04L 9/00* (2006.01)

(52) U.S. Cl. ........................... 370/254; 726/6
(58) Field of Classification Search .................. 370/254; 726/6
See application file for complete search history.

(56) References Cited

U.S. PATENT DOCUMENTS

| | | | |
|---|---|---|---|
| 2005/0097356 A1* | 5/2005 | Zilliacus et al. | 713/201 |
| 2006/0139833 A1* | 6/2006 | Ranta et al. | 361/113 |
| 2007/0153739 A1* | 7/2007 | Zheng | 370/331 |
| 2007/0201540 A1* | 8/2007 | Berkman | 375/219 |
| 2008/0239075 A1* | 10/2008 | Mehrotra et al. | 348/143 |
| 2008/0263647 A1* | 10/2008 | Barnett et al. | 726/6 |
| 2011/0154038 A1* | 6/2011 | Qi et al. | 713/170 |

* cited by examiner

*Primary Examiner* — Ronald Abelson
(74) *Attorney, Agent, or Firm* — Joseph P. Merhle; Kevin P. Belote

(57) ABSTRACT

High speed wireless infrastructures and techniques are provided. Wireless radios are situated within an enterprise, each radio positioned at the end of the wireless frequency range for that of a neighboring radio. Each radio wireless transmits using direction steerable antennas at 60 Gigahertz. At lease one radio is interfaced to a back-end enterprise information server. Each radio capable of interfacing to a consumer's wireless device within the enterprise when that wireless device is within range of the directional steerable antennas. The wireless radios and the back-end information server combine to form a high speed wireless communication network within the enterprise.

20 Claims, 5 Drawing Sheets

HIGH SPEED WIRELESS INFRASTRUCTURE

BACKGROUND

Increasingly, stores, malls, amusement parks, tourist areas, sporting arenas are becoming very large and geographically dispersed. The small mom and pop stores are dying breeds. This is especially true with the advent of Walmart and the desire of enterprises to compete on the same scale as Walmart. Consequently, most stores sell a huge variety of goods and services to customers and want customers to come to those stores for all their purchasing needs.

Stores or enterprises are regularly attempting to reduce expenses while improving customer relations. One area where a customer's experience with an enterprise is improving is via wireless information transfer between the enterprises and their customers and wireless transactions between the enterprises and the customers.

It is not uncommon for stores to provide wireless networks where customers communicate with the stores via portable devices of the customers, such as via cell phones. Enterprises can provide coupons, store information, and even sell items such as tickets to events and the like. As an added bonus, many enterprises provide wireless connectivity to customers for access to the Internet while on the premises of the enterprises.

Existing wireless technologies are fraught with bandwidth limitations that can limit what services an enterprise can reasonably provide to their customers. Most existing wireless networks within enterprises are limited to transfer rates at 54 Mbs (megabits per second) or less. At these rates, transferring large files or streaming video is a real challenge.

SUMMARY

In various embodiments, high speed wireless communication within an enterprise is presented. According to an embodiment, a method for establishing a high speed wireless communication within an enterprise is provided. Specifically, a plurality of wireless radios is situated within a grid layout for an enterprise. Each wireless radio is configured to use four transmission frequencies and each frequency wirelessly transmitting at 60 Gigahertz (GHz) using directional steerable antennas. At least one directional steerable antenna is positioned for a particular wireless radio on each side of each wireless radio. Next, each wireless radio is enabled to provide a wireless high speed communication network within the enterprise.

DETAILED DESCRIPTION

Figure 1:
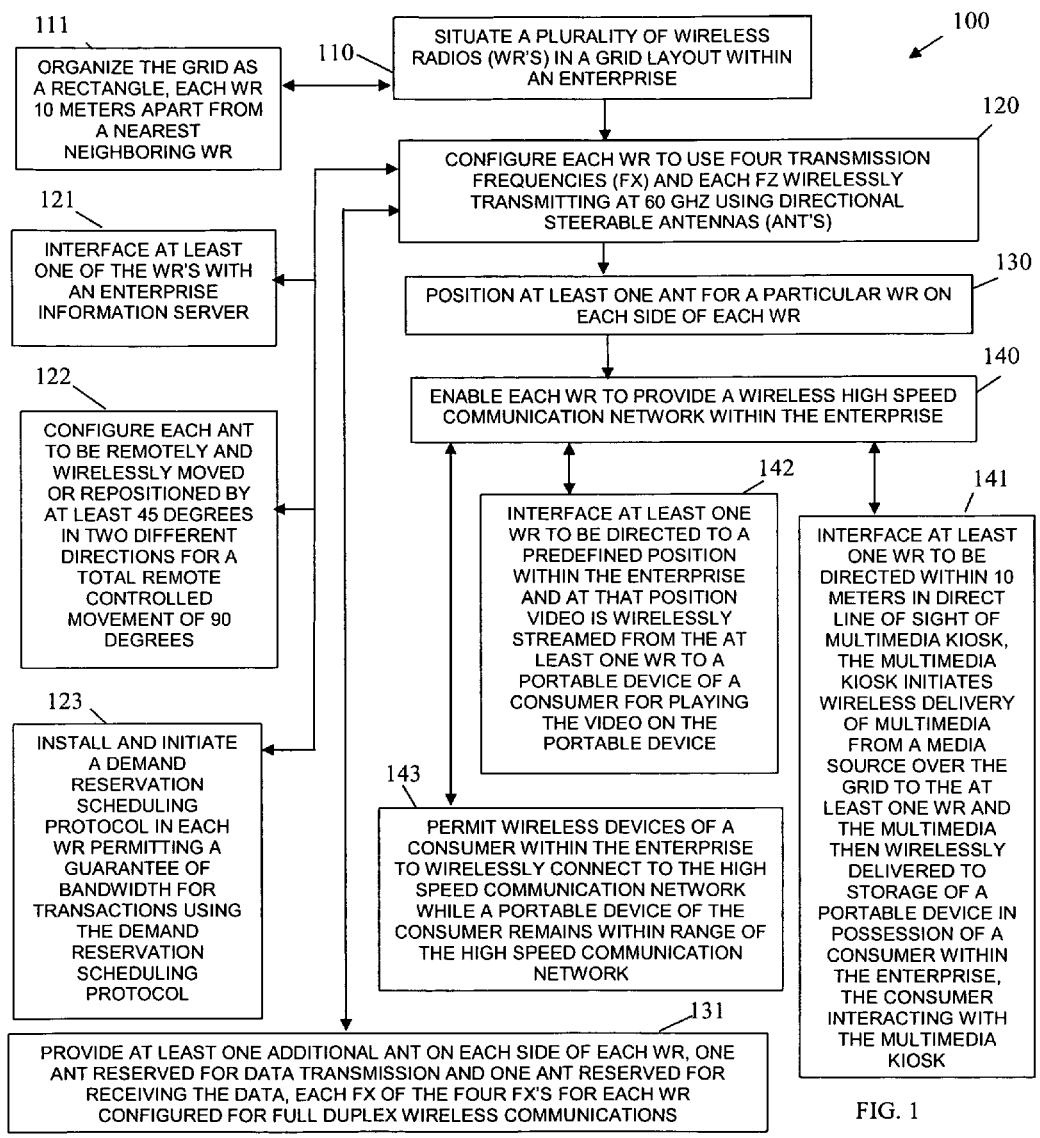
FIG. 1 is a diagram of a method for establishing a high speed wireless communication within an enterprise, according to an example embodiment.

FIG. 1 is a diagram of a method 100 for establishing a high speed wireless communication within an enterprise, according to an example embodiment. Some aspects of the method 100 are implemented as instructions residing on a computer-readable storage medium and executed by a plurality of processors. The processors are specifically configured to process certain aspects of the method 100. The method 100 forms and establishes a high speed wireless communication network within an enterprise.

At 110, a plurality of wireless radios (e.g., routers, switches, hubs, etc.) a physically situated in a grid layout within an enterprise.

According to an embodiment, at 111, the grid is organized as a rectangle with each wireless radio geographically situated 10 meters (about 30 feet) apart from that wireless radio's nearest neighboring wireless radio. So, no wireless radio is within 10 meters of another wireless radio. This configuration is designed to avoid interference and to ensure that each wireless radio is still within range of another wireless radio within the grid. It is noted that a rectangle arrangement may not always be possible at any given facility; in such a case, other arrangements of the grid can be configured providing interference is minimized and each wireless radio is still within contact of a next wireless radio to relay and transfer signals within the grid.

At 120, each wireless radio is configured to use four transmission frequencies (F1-F4). Each wireless frequency transmits at 60 Gigahertz (GHz) using directional steerable antennas. At 60 GHz the wireless data transmission rate can be up to 7 Gigabits per second (Gbs). Most wireless networks are only capable of 54 Megabits per second (Mbs). The 7 Gbs transmission rate is a 129 fold increase over the 54 Mbs. It is readily apparent that this huge increase in data transmission can provide a plethora of opportunities. For instance, a 1.5 Gigabyte (Gb) movie on a standard Digital Versatile Disk (DVD) would take nearly 4 minutes to download at the conventional wireless rate of 54 Mbs; conversely the same movie at the 7 Gbs would take about 2 seconds.

In an embodiment, at 121, at least one of the wireless radios is interfaced to a back-end wireless information server. The enterprise server can be connected to the Internet or connected over a Wide Area Network (WAN) to a geographically remote enterprise facility. The enterprise server can also be connected to private networks, such as a satellite link as an interconnection mechanism to distribute content (e.g., movie updates, etc.) to a lot of locations simultaneously. So, the enterprise server provides connectivity from the wireless radios to the data warehouse and resources of the enterprise and to outside networks (public and/or private).

In another case, at 122, each antenna is configured to be remotely and wirelessly moved or repositioned by at least 45 degrees in two directions (90 degrees total). This permits the directional antennas to be focused on wireless devices of consumers positioned at locations within the enterprise because the 60 GHz is achieved via a directed beam for a limited distance (such as the 10 meters discussed above). Therefore, each antenna can be moved to focus on locations within a span of 90 degrees (45 degrees in two directions). Software instructions can also be processed on the wireless routers to automatically move the antennas. This includes antenna beam steering mechanisms as well.

In still another situation, at 123, a demand reservation scheduling protocol can be installed and initiated on each or selective ones of the wireless radios. This allows for a guarantee of bandwidth for a particular transaction for a particular customer having a wireless device within the enterprise. This is discussed in greater detail below with reference to the FIG. 4.

At 130, at least one antenna for a particular wireless radio is positioned on each side of the wireless radio (see the FIGS. 4 and 5 below for a visual depiction of this arrangement). Here, the wireless radios have 4 sides and each side has at least one directional steerable antenna.

According to an embodiment, at 131, all or at least one of the wireless radios have one additional antenna on each side of the wireless radios. So, each side of the wireless radios has 2 directional steerable antennas. One antenna is used for transmission at one of the designated frequencies and another of the antennas is used for receiving data at that designated frequency. This permits full duplex communication along each of the four sides of the wireless radios (see the FIG. 4 and related discussion below). Separation can be achieved via an antenna pattern and the antennas' locations. Additional separation to reduce crosstalk between transmit and receive antennas can be achieved by using polarization, either circular or linear.

At 140, each wireless radio is enabled to provide a wireless high speed communication network within the enterprise. That is, the wireless radios are configured to interface with one another, relaying signals along paths through the network so a consumer with a wireless device can access resources, information, and content within the wireless network beyond the 10 meter limit of any particular wireless device transmitting at 60 GHz.

According to an embodiment, at 141, at least one of the wireless radios and one of its antennas at a particular one of the four frequencies is directed within 10 meters and in direct line of sight of a multimedia kiosk within the enterprise. Here, the multimedia kiosk initiates wireless delivery of multimedia from a media source or media server accessible to the wireless network over the grid using the wireless router in line of sight; the delivery is directed via an antenna at a particular frequency to storage of a portable device that is in possession of a consumer within the enterprise. The consumer interacts with the multimedia kiosk to purchase multimedia, such as movies, music, etc.

In another situation, at 142, at least one of the wireless radios is directed and interfaced to a predefined position within the enterprise. At that particular position, video is wirelessly streamed from the wireless radio (via an antenna at a particular frequency) to a portable device of the consumer for playing the video on the portable device of the consumer. So, directed videos can be obtained by the consumer, via the portable device (such as a phone), when the consumer is in a predefined location within the enterprise, such as while in the electronics department where a video plays advertisements for a particular product the enterprise is pitching.

In still another case, at 143, wireless devices of a consumer within the enterprise are permitted to wireless connect to the high speed communication network while a portable device of the consumer remains within range of the high speed communication network. Thus, consumers can connect to and utilize the resources (made available by enterprise policy) of the high speed communication network using the consumers' portable devices (phones, netbooks, laptops, iPod Touch®, and the like).

Figure 2:
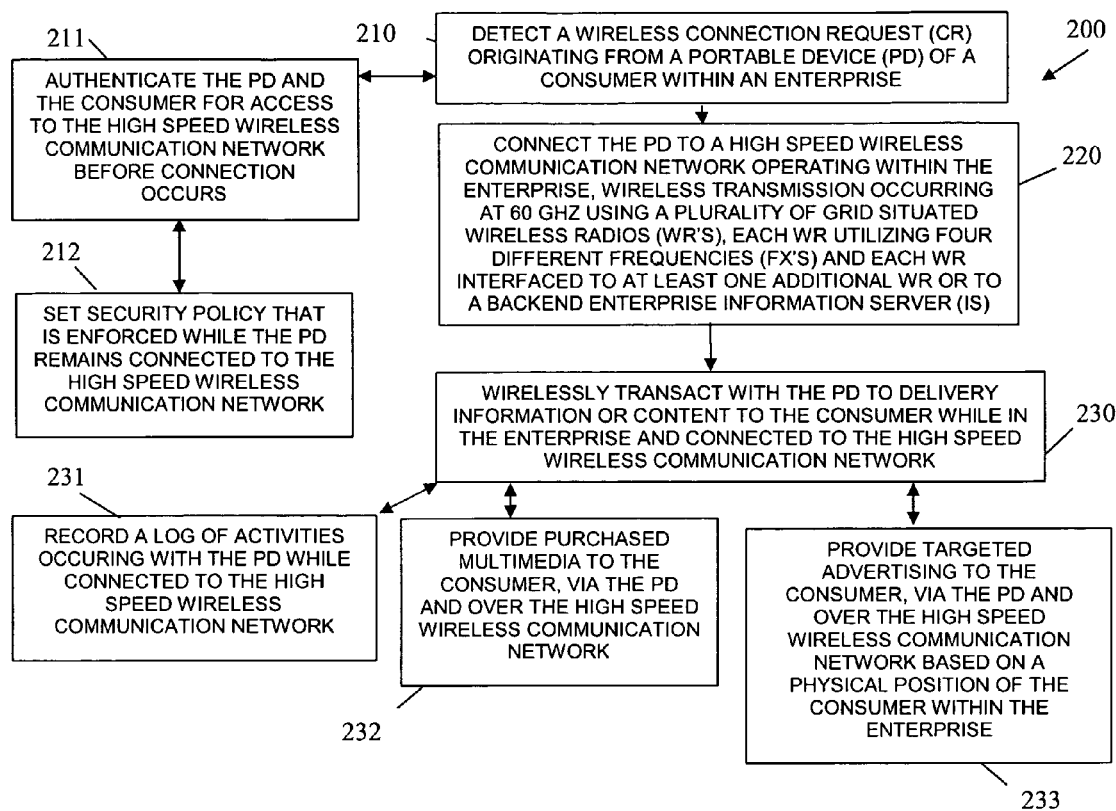
FIG. 2 is a diagram of a method for operating a high speed wireless communication within an enterprise, according to an example embodiment.

FIG. 2 is a diagram of another method 200 for operating a high speed wireless communication within an enterprise, according to an example embodiment. The method 200 (hereinafter "high speed wireless service") is implemented as instruction within a computer-readable storage medium that execute on a plurality of processors, the processors specifically configured to execute the high speed wireless service. The high speed wireless service forms and provides a high speed wireless communication network within an enterprise.

The high speed wireless service represents operational characteristics of the high speed wireless communication network established by the method 100, presented above with respect to the discussion of the FIG. 1.

At 210, high speed wireless service detects a wireless connection request originating from a portable device of a consumer within an enterprise.

According to an embodiment, at 211, the high speed wireless service authenticates the portable device and the consumer for access to the high speed wireless communication network before the connection occurs to the network.

Continuing with the embodiment of 211 and at 212, the high speed wireless service sets security policy that is enforced while the portable device remains connected to the high speed wireless communication network. So, automated security can be enforced to ensure that some consumers with a higher security clearance can utilize more resources than other consumers with lower security clearance. For instance, different levels of enterprise loyalty can permit different access to resources within the network.

At 220, the high speed wireless service connects the portable device to the high speed wireless communication network. The high speed wireless communication network operates at 60 GHz using a plurality of grid situated wireless radios. Each wireless radio utilizing four different frequencies and each wireless radio interfaced to at least one additional wireless radio or to a back-end enterprise information server. This configuration was described in detail above with reference to the FIG. 1 and is described in greater detail below with reference to the FIGS. 4-5.

At 230, the high speed wireless service wirelessly transacts with the portable device to deliver information or content to the consumer while in the enterprise and connected to the high speed wireless communication network.

According to an embodiment, at 231, the high speed wireless service records a log of activities occurring with the portable device while connected to the high speed wireless communication network. The activities within the log can also be dynamically evaluated so that should a consumer be performing suspicious activity as compared to policy or templates for detecting suspicious activity, that consumer can be disconnected automatically from the network. The log can also later be mined to see how consumers are using the resources of the network to improve the network or to see how a particular consumer is using the network to enhance each consumer's experience with the network during subsequent visits to the enterprise. So, this log of activities can be used by the enterprise in marketing campaigns or for other customer relationship management activities.

In another case, at 232, the high speed wireless service provides purchased multimedia to the consumer, via the portable device and over the high speed wireless communication network. Examples of this were provided above with reference to the FIG. 1.

In yet another situation, at 233, the high speed wireless service provides targeted advertising to the consumer, via the portable device and over the high speed wireless communication network based on a physical position of the consumer within the enterprise. Again, this situation was also presented above with reference to the FIG. 1.

Figure 3:
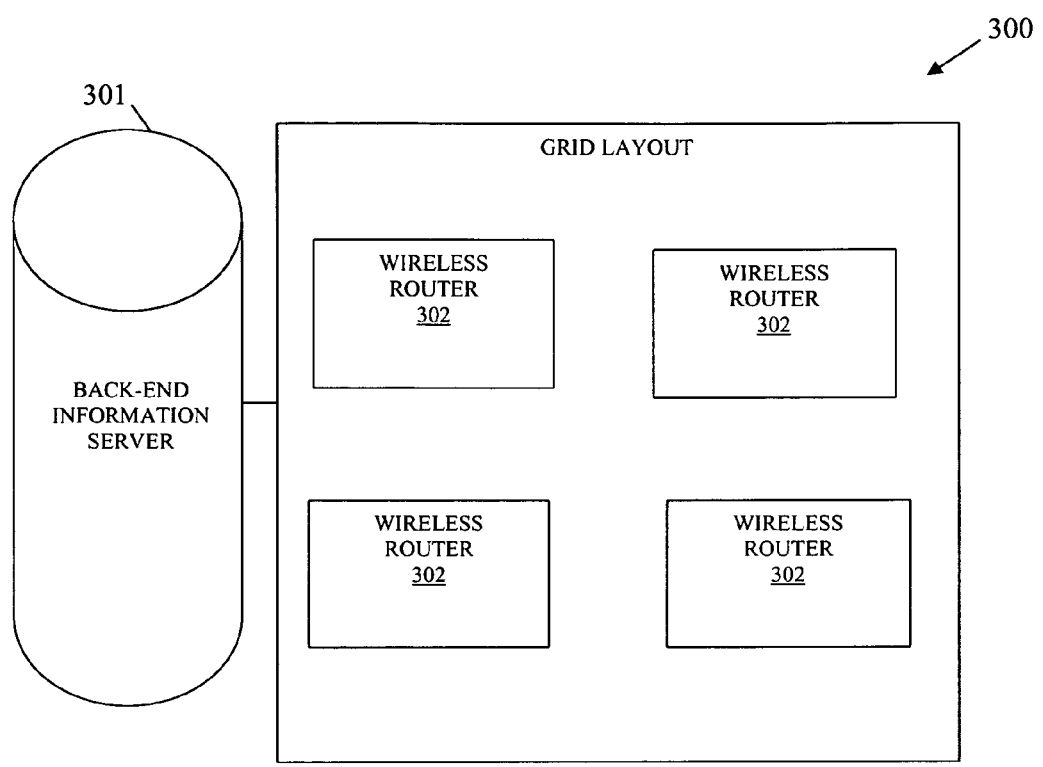
FIG. 3 is a diagram of an enterprise high speed wireless communication system, according to an example embodiment.

FIG. 3 is a diagram of an enterprise high speed wireless communication system 300, according to an example embodiment. The enterprise high speed wireless communication system 300 is implemented as instructions residing in computer-readable storage media and to execute a plurality of processors (embedded in network devices (routers, switches, hubs, etc.) to collectively form a high speed wireless network within an enterprise.

The enterprise high speed wireless communication system 300 implements, inter alia, the methods 100 and 200 of the FIGS. 1 and 2, respectively.

The enterprise high speed wireless communication system 300 includes a back-end information server 301 and a plurality of wireless routers 302. Each of these and their interactions with one another will now be discussed in turn.

The back-end information server 301 is configured to receive data from the wireless routers 302 and to deliver data to the wireless routers 302.

In an embodiment, the back-end information server 301 is configured to access the Internet and provide content from the Internet to the high speed wireless communication network (discussed below). The back-end information server 301 is also configured to deliver information from the high speed wireless communication network to services located remote from the enterprise over the Internet.

The wireless routers 302 are arranged in a grid layout throughout an enterprise. Aspects of the configuring the wireless routers 302 were presented above with reference to the FIG. 1. Also, processing features of the wireless routers when operational to form a high speed wireless communication network were presented in detail above with reference to the FIG. 2.

Each wireless router 302 is configured to wirelessly receive and wirelessly transmit data within the enterprise over the grid at 60 GHz. Moreover, each wireless router 302 is further configured to interact with at least one additional wireless router 302 and each wireless router 302 configured to interact with wireless devices of consumers within the enterprise.

The back-end information server 301 and the wireless routers 302 are configured and interfaced to one another to provide the high speed wireless communication network within the enterprise to the wireless devices of the consumers.

According to an embodiment, each wireless router 302 is configured with four pairs of directional steerable antennas. Each pair of the directional steerable antennas is situated on one side of the particular wireless router to which that pair is related (see the FIG. 4 and related discussion and the above discussion associated with the FIG. 1). One antenna of a pair is used for data transmission and the other antenna of the pair is used for data reception permitting full wireless duplex communication on each side of a wireless radio 302 at one of four frequencies transmitting and receiving at 60 GHz.

In another situation, each wireless router 302 is situated within the grid layout at 10 meters from a next and neighboring wireless router. This minimized interference and ensures that communication paths can be achieved through the high speed wireless communication network.

Figure 4:
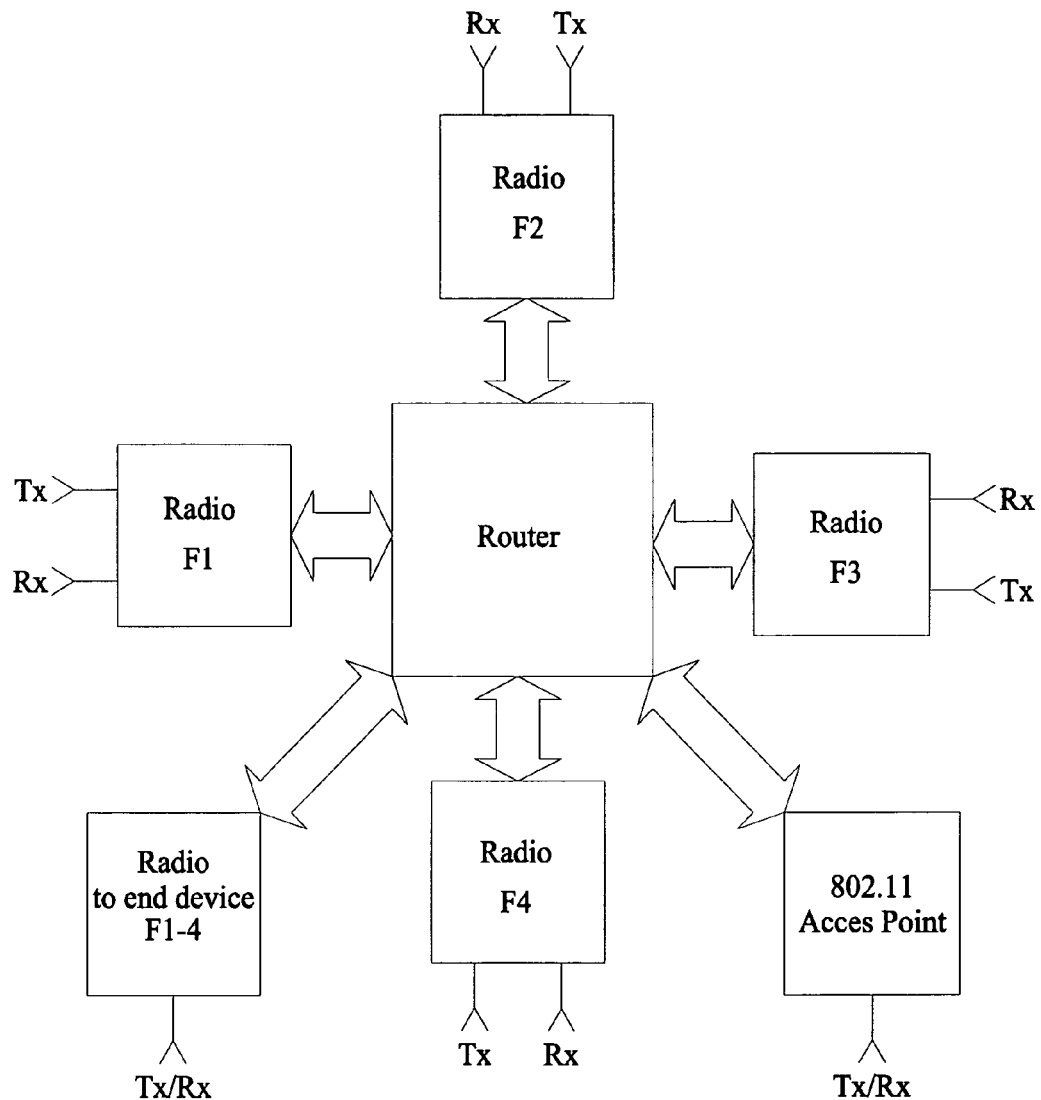
FIG. 4 is a diagram of a sample enterprise high speed wireless architecture for a wireless router, according to an example embodiment.

FIG. 4 is a diagram of a sample enterprise high speed wireless architecture for a wireless router, according to an example embodiment. It is noted that the architecture presented is provided as an illustration and that other configurations are possible with additional components (devices and connections) or less components or even components in a different layout. These alternative arrangements are intended to fall within the scope of the present teachings when arranged to perform the techniques presented herein.

Within the context of the discussion of the FIG. 4, example scenarios and implementation details are provided. Again, these are provided for purposes of comprehension and illustration and are not intended to limit of constrain the techniques presented herein.

Wireless communications has continuously increased in data transmission rates in recent years. Specifically, over the last few years technology has progressed to open up the 60 GHz (Gigahertz) ISM (Industrial Scientific and Medial radio bands) frequency band.

Out of this technology the ECMA-387 (European Computing Manufacturers Association) standard has been developed which provides various classes of service at very high speed data rates. ECMA-387 is intended for Personal Area Networks (PAN) and it's class A service is intended for high speed point to point communications, providing multi-gigabit data rates, using directional steerable (beam steering) antennas.

The techniques presented herein and above provide usage multiple point to point links (all 4 frequencies of ECMA-387) or modified versions thereof (in terms of coding and error correction), in one unit and to mount these units on the ceiling of an enterprise or on top of a DVD (Digital Versatile Disk or Digital Video Disk) kiosk in line of sight of each other.

The communications logic in these units (processing devices, routers, switches, hubs, etc.) is essentially a router or switch architecture and can be either connection or packet communications oriented.

Any particular device (unit) receives high speed data on one of its high speed communications links, on for instance frequency 1 (F1), and routes the data with minimal buffering to one of the other ports (antennas) directed another router/switch unit at another frequency (F2) or downward to another end unit, in this case a DVD kiosk at yet another frequency (F3).

In some cases, these routers (configured with the techniques presented herein) implement a demand reservation type scheduling protocol for communications that requires consistent delays, for instance audio and video streams for direct consumption by a customer or consumer of the enterprise.

Demand reservation implies that a certain traffic capacity (bandwidth) is reserved in the communication's stream for the duration of the connection to guarantee a certain level of quality in terms of overall delay, delay variation, and/or error rate, which translated into glitches, noise and pixelization in video streams. In the case of DVD downloads on a kiosk, demand reservation guarantees that the data is transferred with minimum delay to result in an acceptable transaction time for the consumer that is checking out a video. Here the kiosk is designed to provide high speed wireless video download to a device (memory stick, cell phone, etc.) of the consumer.

The highly directive nature of the wireless communications antennas at 60 GHz allows the use of very small beam steering antennas. This enables re-use of the same frequency in the same device if antennas are pointed in different directions without that the signals interfering with each other. It is even possible to use the same frequency at separate transmit and receive antennas pointing at another device and transmit and receive two separate data streams simultaneously, i.e. implement full duplex communications.

Other Uses

The systems and techniques described above can be used as a backbone (infrastructure) for other wireless communications. A standard 802.11 unit (either 2.4 or 5 GHz) can be added as an interface to existing retail or consumer devices such as a cell phone equipped with WiFi (wireless communications).

This allows for direct high speed communications to a cell phone and enables a high level of interaction with the consumer in the store (enterprise); for instance, for advertising videos or product information. This can be initiated by consumer action such as taking a picture of a product, barcode or advertising display and be driven by a web application hosted on the store (enterprise) infrastructure.

Obviously other communications schemes can be integrated such as an in-door version of Wi-Max, Bluetooth or even RFID (Radio Frequency Identification) based communication for low end devices.

Figure 5:
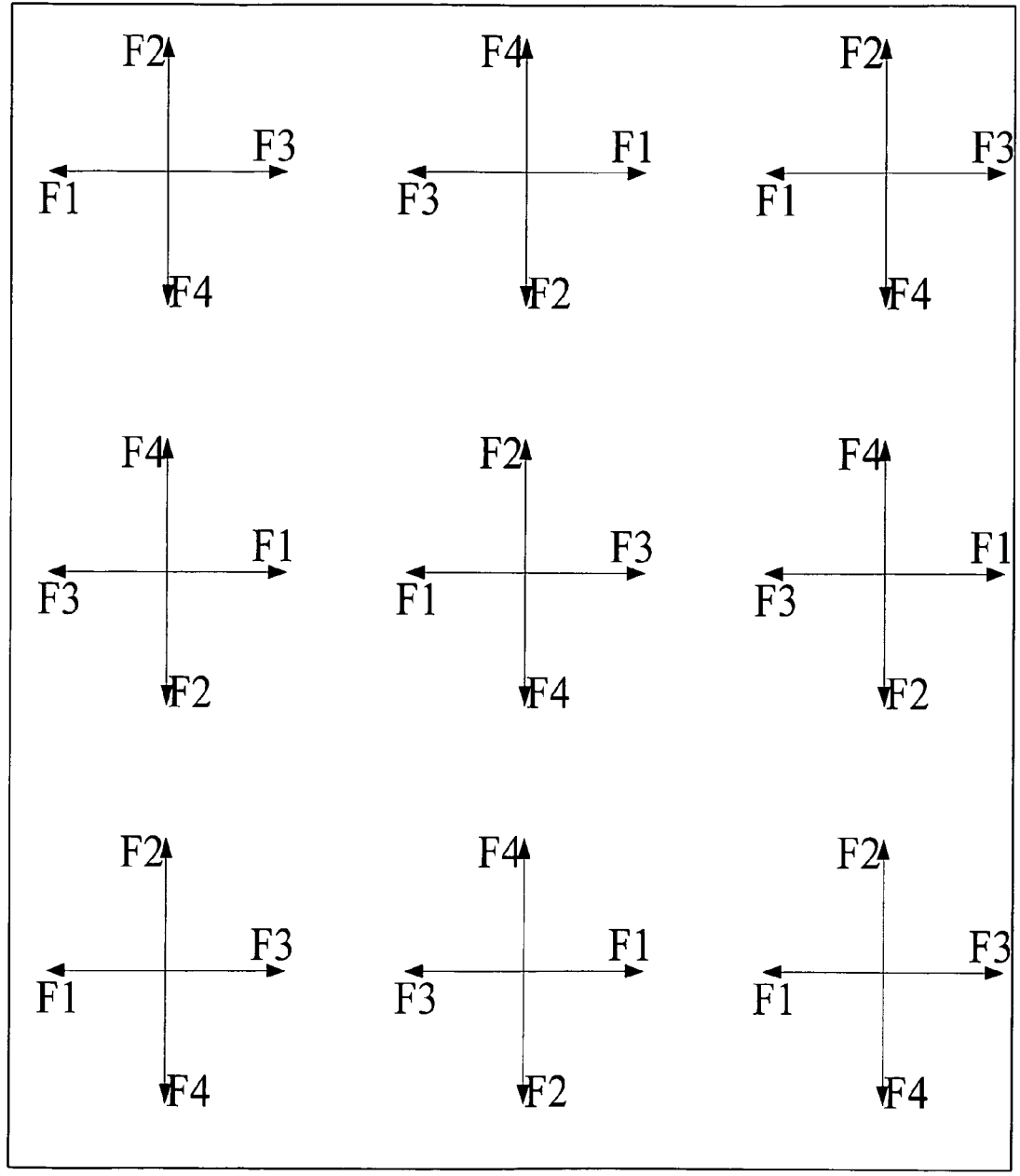
FIG. 5 is a diagram of a sample transmission configuration (grid layout) for an enterprise high speed wireless communication network, according to an example embodiment.

FIG. 5 is a diagram of a sample transmission configuration for an enterprise high speed wireless communication network, according to an example embodiment.

The FIG. 5 presents a layout grid for transmission devices within an enterprise to provide optimal high speed wireless communication. It is noted that other layouts are foreseeable and can be achieved without departing from the teachings provided herein when such arrangements perform the techniques provided herein.

Again, the FIG. 5 is discussed in terms of the sample layout and sample scenarios that are not intended to limit the other aspects of the teachings presented herein and above. For example, in some cases the grid can be arranged as a hexagonal grid layout, rather than the rectangle layout depicted in the FIG. 5. In such, a hexagonal layout just 3 frequencies are needed.

Installation and Frequency Re-Use

A large store or infrastructure can be set up using multiple devices re-using the same frequency.

For example, the FIG. 5 shows an example of an infrastructure (section) with re-use of the frequencies alternation between rows and columns. The distance between the rows and columns is highly dependant on the actual radio and antenna designs. The ECMA standard promises a distance of 10 meters, about 30 feet. It should be straight forward to extend this with improved antenna designs.

Directive steerable antennas provide enough distance and separation between radios to allow re-use. For instance the F2 used vertically in ceiling unit in position 1,1 (bottom left) is aimed at the receiver at position 2,1 (middle left). Due to the line of sight communications and highly directive nature of the antennas the only interfering transmitters for the receiver at 1,1 are towards the top of the diagram in column 1. In the FIG. 5 this would be position 4,1 (outside the FIG. 5).

This interfering transmitter is located at a 3 times the distance of the intended transmitter, which results in a theoretical signal to interference ratio of about 10 dB, sufficient for good communications quality provided the proper encoding and error correction is used.

In addition by using alternating left and right handed circular polarization or horizontal and vertical polarization the interference can be further reduced, such that the first interfering transmitter is in position 6,1 at 5 times the distance resulting in a signal to interference ratio of about 15 db.

In many installations, the building layout may not allow for a neat rectangular layout in all parts of the building. The layout example in the FIG. 5 is a simple rectangular layout. The antenna design, however, is intended such that the antenna directivity is electronically steerable over an angle of at least 90 (+/−45) degrees. This means that more complex layouts are easily implemented provided that potential interference is accounted for. The antenna directivity limits the angle over which the interference is a potential problem and simplifies layout.

Finally, the architecture and connectivity presented in this concept allows for alternate routing of traffic. More than one route exists for traffic from one end-device to another end device.

The best route can be chosen based on momentary traffic conditions. It also allows for redundancy in case of failure of a device.

The techniques and systems presented herein provide for a high speed wireless infrastructure suitable for transfer of large data volumes from a server to an end device such as DVD content to a kiosk, and the like.

In addition the provided techniques and systems provide for an infrastructure with a high degree of scalability for multiple applications that require a high aggregate throughput such as many customers in a store accessing information about products on the shelf of the store (enterprise).

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
situating a plurality of wireless radios in a layout within an enterprise, the layout configured to reduce interference and to ensure that each wireless radio is within range of at least one additional wireless radio within the layout to relay and transfer signals within the layout;
configuring each wireless radio to use four transmission frequencies and each frequency wirelessly transmitting at 60 Gigahertz (GHz) using directional steerable antennas;
positioning at least one directional steerable antenna for a particular wireless radio on each side of each wireless radio; and
enabling each wireless radio to provide a wireless high speed communication network within the enterprise.

2. The method of claim 1, wherein situating further includes organizing the layout as a rectangle, each wireless radio 10 meters apart from a nearest neighboring wireless radio.

3. The method of claim 1, wherein configuring further includes interfacing at least one of the wireless radios with an enterprise information server.

4. The method of claim 1, wherein configuring further includes configuring each directional steerable antenna to be remotely and wirelessly moved or repositioned by at least 45 degrees in two different directions for a total remote controlled movement of 90 degrees.

5. The method of claim 1, wherein configuring further includes installing and initiating a demand reservation scheduling protocol in each wireless radio permitting a guarantee of bandwidth for transactions using the demand reservation scheduling protocol to download transaction related content to a portable wireless device of a user within the enterprise.

6. The method of claim 1, wherein positioning further includes providing at least one additional directional steerable antenna on each side of each wireless radio, one directional steerable antenna reserved for data transmission and one direction steerable antenna reserved for receiving the data, each frequency of the four frequencies for each wireless radio configured for full duplex wireless communications.

7. The method of claim 1, wherein enabling further includes interfacing at least one wireless radio to be directed within 10 meters in direct line of sight of the multimedia kiosk, the multimedia kiosk initiates wireless delivery of multimedia from a media source over the grid to the at least one wireless radio and the multimedia then wirelessly delivered to storage of a portable device in possession of a consumer within the enterprise, the consumer interacting with the multimedia kiosk.

8. The method of claim 1, wherein enabling further includes interfacing at least one wireless radio to be directed to a predefined position within the enterprise and at that position video is wirelessly streamed from the at least one wireless radio to a portable device of a consumer for playing the video on the portable device.

9. The method of claim 1, wherein enabling further includes permitting a portable wireless device of a consumer within the enterprise to wirelessly connect to the high speed communication network while the portable wireless device of the consumer remains within range of the high speed communication network.

10. A multi-processor implemented method to execute on a plurality of processors configured to execute the method, comprising:
  detecting, via one of the processors, a wireless connection request originating from a portable wireless device of a consumer within an enterprise;
  connecting, via one of the processors, the portable wireless device to a high speed wireless communication network operating within the enterprise, wireless transmission occurring at 60 Gigahertz (GHz) using a plurality of wireless radios arranged in a layout within the enterprise configured to reduce interferenceand to ensure that each wireless radio is within range of another wireless radio within the layout to relay and transfer signals within the layout, each wireless radio utilizing four different frequencies and each wireless radio interfaced to at least one additional wireless radio or to a backend enterprise information server; and
  wirelessly transacting, via one of the processors, with the portable wireless device to deliver information or content to the consumer while in the enterprise and connected to the high speed wireless communication network.

11. The method of claim 10, wherein connecting further includes authenticating the portable wireless device and the consumer for access to the high speed wireless communication network before connection occurs.

12. The method of claim 11, wherein authenticating further includes setting security policy that is enforced while the portable wireless device remains connected to the high speed wireless communication network.

13. The method of claim 10, wherein wirelessly transacting further includes recording a log of activities occurring with the portable wireless device while connected to the high speed wireless communication network.

14. The method of claim 10, wherein wirelessly transacting further includes providing purchased multimedia to the consumer, via the portable wireless device and over the high speed wireless communication network.

15. The method of claim 10, wherein wirelessly transacting further includes providing targeted advertising to the consumer, via the portable device and over the high speed wireless communication network based on a physical position of the consumer within the enterprise.

16. A system, comprising:
  a back-end information server situated within an enterprise;
  a plurality of wireless routers arranged in a layout throughout the enterprise, the layout configured to reduce interference and to ensure that each wireless radio router is within range of at least one additional wireless router within the layout to relay and transfer signals within the layout; and
  the back-end information server configured to receive data from the wireless routers and deliver data to the wireless routers, and each wireless router configured to wirelessly receive and wirelessly transmit the data within the enterprise and over the grid layout at 60 Gigahertz (GHz), and each wireless router further configured to interact with the at least one additional wireless router and each wireless router configured to interact with wireless devices of consumers within the enterprise, the back-end information server and the wireless routers configured to provide a high speed wireless communication network within the enterprise to the wireless devices of the consumers.

17. The system of claim 16, wherein the back-end information server is configured to access the Internet to provide content from the Internet to the high speed wireless communication network and to deliver information from the high speed wireless communication network to services located remote from the enterprise over the Internet.

18. The system of claim 16, wherein each wireless router is configured to transmit and receive wirelessly in full duplex via four separate frequencies.

19. The system of claim 16, wherein each wireless router is configured with four pairs of directional steerable antennas, each pair of the directional steerable antennas situated on one side of the particular wireless router to which that pair is related.

20. The system of claim 16, wherein each wireless router is situated within the layout at 10 meters from a next and neighboring wireless router.

* * * * *